United States Patent Office 3,623,848
Patented Nov. 30, 1971

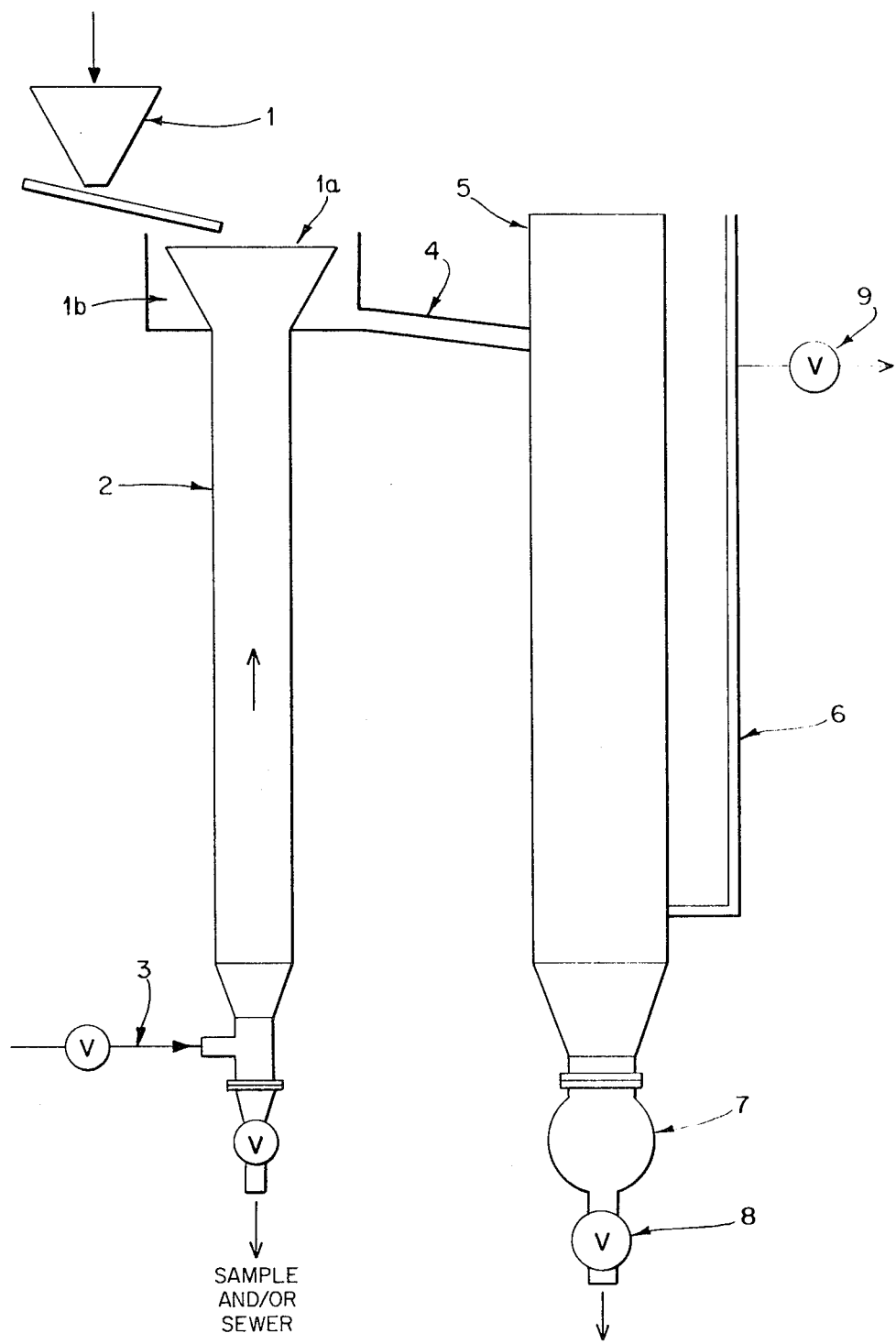

3,623,848
PROCESS FOR BRINE MANUFACTURE
Harry Mueller Fisher, deceased, late of Gilbertsville, Ky., by Mary E. C. Fisher, administratrix, and Jesse Gyger Grier, Gilbertsville, Ky., assignors to Pennwalt Corporation, Philadelphia, Pa.
Continuation-in-part of abandoned application Ser. No. 559,214, June 21, 1966. This application Oct. 29, 1969, Ser. No. 871,796
Int. Cl. C01d 3/08; B01j 11/02
U.S. Cl. 23—312                                3 Claims

ABSTRACT OF THE DISCLOSURE

A process for increasing the concentration of a depleted sodium chloride brine solution by introducing salt of about minus 6 U.S. sieve size and containing calcium sulfate as an impurity into the top of a vertical salt-bed free first column through which brine at a pH of above about 3.5 is flowing upwardly at a linear flow rate between about 15 and 25 feet per minute, the brine in the first column then overflowing into a second salt-bed free column where the linear downwardly flow rate is between about 0.1 and 3 feet per minute, whereby the salt particles are partially dissolved in the first column until they are carried over into the second column where they fall freely through the downwardly flowing brine solution until essentially completely dissolved at a point above a trap for undissolved calcium sulfate, thereby producing as effluent from the second column a concentrated brine solution low in calcium ion concentration.

---

This application is a continuation-in-part application of Ser. No. 559,214, filed June 21, 1966, now abandoned.

This invention relates to an improved process for preparing brine (e.g. alkali metal halide) solutions and is particularly concerned with increasing the concentration of brine solutions depleted by their use in electrolysis cells where sodium chloride brine is converted to chlorine and sodium. More particularly, the invention concerns the dissolution of salt containing calcium sulfate as an impurity, which when dissolved according to the process of the invention, results in a brine effluent very low in calcium sulfate and this is achieved without significant loss of salt.

In U.S. Pat. 3,130,016 to J. G. Grier, there is disclosed a process for brine manufacture by dropping salt particles containing calcium sulfate as an impurity into the top of a vertical unobstructed column through which is flowing an unsaturated brine solution. The salt particles drop freely through the flowing brine solution whereby the sodium chloride is dissolved. The calcium sulfate, however, does not dissolve because of its low rate of solution, and it drops into a trap whereby a concentrated brine solution of high purity is obtained as the output from the column. As pointed out in the above-mentioned patent, the particle size of the salt used will be of the size range so that little or no salt falls through the column without dissolving, for if the salt particles are not completely dissolved, the process would result in a high salt loss and therefore become uneconomical. From a practical standpoint, the process disclosed requires that the salt size be between about 14 and 60 U.S. standard sieve size, since the use of larger salt particles would require a column height that would make the process impractical. However, there is now commercially available a fine salt which contains particles of the size much larger than U.S. sieve size 14. Rather than grinding such salt so that all of its content is within 14 to 60 U.S. sieve size, it is desired to use the commercial material "as is" in a process which will give the benefits of the process described and claimed in U.S. 3,130,016.

It is an object of this invention to provide a process improvement over that disclosed in the above Grier patent whereby salt containing very coarse particles may be employed. It is a further object to provide a salt dissolving process which is economical with coarse salt sizes and which has the benefits of a falling salt dissolving procedure.

In accord with this invention there is provided the process of increasing the concentration of a less than saturated brine solution, preferably sodium chloride brine, by introducing salt of about 6 mesh minus (U.S. sieve size) and containing calcium sulfate as an impurity, into the top of a vertical saltbed free first column through which brine at a pH above about 3.5 is flowing upwardly, said brine being introduced to said column at a linear flow rate between about 15 and about 25 feet per minute, the brine in said first column overflowing into a second salt-bed free column where the linear downward flow rate of said brine is between about 0.1 and about 3 feet per minute, whereby said salt particles are partially dissolved in said first column until they are carried over by the brine flow into said second column where they fall freely through said downwardly flowing brine solution until they are essentially completely dissolved at a point above a trap for undissolved calcium sulfate in which the insoluble calcium sulfate impurity collects, thereby producing as effluent from said second column a concentrated brine solution low in calcium ion concentration.

It should be understood that a significant factor in the operation of this invention is the brine velocity in the first upwardly flowing column with respect to the salt falling velocity. In the process of U.S. 3,130,016 empolying a single column, the brine velocity is small relative to the rate of salt fall and thus has an insignificant effect on the time a salt particle remains in the column. In this invention, however, the rate of upward brine flow is significant with respect to the salt fall since it affects both solution and carry over of salt particles into the second column.

It will be understood, of course, that the rate of introduction of salt at the top of the first dissolver will be controlled to avoid the formation of a salt bed in the column. Likewise, the rate of salt addition will be sufficient to provide an amount of salt in the column which will be meaningful from an efficiency stand-point, i.e. enough salt will be introduced into the first column to provide an economical process in that solution in the first column and carryover of salt into the second column will occur.

In order to better understand the invention reference is now made to the drawing which illustrates the equipment of the process.

The drawing illustrates a two-column dissolver. A hopper 1 is equipped with a suitable feed or distributing device as for example, a vibrator or rotary feeder, and is employed to feed salt into a conical or equivalent section 1a at the top of vertical column 2 which may be cylindrical, rectangular or of other generally uniform cross section. Surrounding the conical section is an overflow area 1b which opens to output line 4. The rate of salt feed is selected so that the brine output is at the desired concentration. Depleted brine solution is introduced at input line 3 and flows upwardly through the column overflowing through output line 4 where it enters the top of vertical column 5. The vertical column 5 is similar to the apparatus described in U.S. 3,310,016, and although it lacks the hopper section at the top, it is provided with output line 6, calcium sulfate trap 7, valve 8 used to clean out the calcium sulfate impurity, and valve 9 in the output line. In operation, salt from the hopper 1 flows into the conical section 1a and to column 2. The rapidly upwardly flowing brine dissolves and carries over salt of about 14 to about 60 U.S. sieve size and dissolves the coarse salt within column 2 until the particle size approaches a size equivalent to 14 U.S. sieve size. This size salt is then carried over into the overflow area 1b and then into column 5. The salt particles drop through the brine falling downwardly through column 5 and are essentially completely dissolved as they reach a point above the calcium sulfate trap 7. The undissolved calcium sulfate impurity continues to fall into the trap and the concentrated brine solution is removed at exit line 6 to provide high purity brine solution.

In a preferred method of operation, column 2 will be operated so that the brine level at the top of the column is actually above the conical section 1a. It has been found by operating in this manner that calcium pick-up in the output brine is held to a very low level. Operation in this manner is accomplished simply by controlling the valve on output line 6. The level of the brine which will occupy the overflow space 1b will normally be kept several inches above the cone, and this level can be controlled by the valve 9 in the outlet line.

In another embodiment of the apparatus used in this invention, a concentric system of column may be employed. In such a system a hopper equipped with a suitable feed or distributing device (e.g., a vibrator or rotary feeder) is used to feed the salt into an internal vertical column of generally uniform cross section. The depleted brine solution is introduced at the bottom of such column and flows upwardly, overflowing into a concentric outer column. As coarse salt from the hopper falls into the inner column, the rapidly upwardly flowing brine partially dissolves the coarse salt until the particle reaches a size approaching 14 U.S. sieve size and this size salt is then carried upwardly and over into the outer column. At this point, the salt particles drop through the brine, falling downwardly through the outer column, and are essentially completely dissolved as they reach a point above the calcium sulfate trap which forms part of the outer column. The undissolved calcium sulfate impurity continues to fall into the trap which may be fitted with transparent sight glasses to observe the build-up, and the trap is periodically cleaned. The fortified brine solution exists from an output line and is used as required. The height of the columns will vary in accordance with the particular commercial installation, but will generally be between about 15 and 50 feet in height for most efficient operation.

It will be understood that except for the particle size of the salt used and the procedural details as set forth above, the significant conditions of the process employed will be those described in U.S. 3,130,016. For example, the preferred temperature will be between about 140° F. and about 175° F. which is the temperature of the deplated brine as it exists from the electrolysis cells, although it is to be understood that brine may be fortified by the process of this invention at temperatures outside this range. The depleted brine entering the column will be, as indicated, less than saturated and will usually contain between about 250 and 275 grams per liter of sodium chloride. The brine solution will have a pH greater than about 3.5, a pH from about 5.0 to 13 being preferred.

The rate of flow of the depleted brine in the first or central concentric column will be as indicated from about 15 to 25 feet per minute, and the preferred range will be from about 18 to about 23 feet per minute. If the rate of flow of brine in the first column is lower than that indicated, it will not have the velocity required to carry over the salt particles as they reach a size of about 14 mesh and accordingly, salt will build up in the first column and will eventually interfere with the process. On the other hand, if the rate of flow of the entering brine is much faster than about 25 feet per minute, then the salt entering the second column will be too large to permit complete solubility during its fall through the column and as a result, there will be high salt losses in the process, and this, of course, is undesirable. It must be understood, however, that in the process of the invention the column dissolvers are unobstructed and there is no initial bed of salt nor is there any salt build-up.

The salt used in the process of this invention will preferably be on the order of six mesh minus which will contain salt particles ranging in size from about 6 to about 60 (U.S. sieve series). A typical screen analysis of the preferred salt size is as follows:

| Screen scale: Openings | | Time 5 minutes | |
|---|---|---|---|
| Inches | U.S. No. | Percent between sieves | Cum. percent[1] |
| 0.132 | 6 | .8 | .8 |
| .0937 | 8 | 20.7 | 21.5 |
| .0787 | 10 | 17.5 | 39.0 |
| .0651 | 12 | 12.7 | 51.7 |
| .0555 | 14 | 9.5 | 61.2 |
| .0469 | 16 | 6.1 | 67.3 |
| .0394 | 18 | 6.9 | 74.2 |
| .0331 | 20 | 5.8 | 80.0 |
| .0278 | 25 | 1.9 | 91.9 |
| .0234 | 30 | 3.1 | 85.0 |
| .0197 | 35 | 1.7 | 86.7 |
| .0098 | 60 | 6.1 | 92.8 |
| .0000 | Pan | 7.2 | 100.0 |
| Total | | 100.0 | |

[1] Total percent on each sieve.

It will be understood that the process may also employ salt containing somewhat larger salt particles, as for example those on the order of −4 inch or even up to 0.5 inch in size.

As a further illustration of the invention, the following examples are given:

EXAMPLE 1

A salt dissolver as described above using the concentric column system was constructed by placing a 15 foot by 1 inch diameter Pyrex pipe in the center of a 16 foot by 4 inch diameter Pyrex pipe, appropriate connections being made for input and output brine. A hopper feeding into the inner pipe was fitted with a vibrating tray feeder. The brine feed was first dechlorinated and introduced into the input at a temperature of 150° F. Heaters on the column maintained the output temperature of the brine at 150° F. The following table indicates the data obtained when salt of −6 U.S. sieve size was fed into the hopper.

TABLE A

| Example | 1 | 2 | 3 | 4 |
|---|---|---|---|---|
| Brine Flow: | | | | |
| Gallons per minute | 0.81 | 0.89 | 0.91 | 1.07 |
| Ft./min.—Up | 19.8 | 21.7 | 22.3 | 26.2 |
| Ft./min.—Down | 1.40 | 1.54 | 1.57 | 1.86 |
| Brine temp. (° F.): | | | | |
| Inlet | 161 | 156 | 155 | 157 |
| Outlet | 153 | 155 | 150 | 148 |
| Salt conc. (grams per liter): | | | | |
| Inlet | 281 | 281 | 279 | 281 |
| Outlet | 317 | 310 | 309 | 308 |
| Percent NaCl not dissolved | 6.0 | 2.4 | 5.4 | 10.9 |
| Calcium pick-up (milligram per liter) | 18 | 16 | 18 | 14 |
| Length of run, hours | 1.5 | 1.25 | 1.2 | 1.2 |

EXAMPLE 2

A salt dissolver comprised of two separate columns as shown in the drawing was constructed so that the first column comprised an 8" x 30' pipe and the second column comprised a 30" x 30' pipe. At the top of the first column was a conical section 12" in top diameter. Salt (−6 U.S. sieve size) was fed from the hopper into the top of the conical section, and brine flow was adjusted so that the brine level in the first column was about 1" above the conical section. The system was operated for about 20 hours with the following average operating characteristics:

Input salt concentration: 281 grams per liter
Output salt concentration: 315 grams per liter
Ca++ content in output brine: 42 milligrams per liter
Salt loss: About 1%

When the brine level in the first column was permitted to fall below the conical section, the calcium ion content of the output brine increased to about 55 m.g.p.l.

We claim:

1. The process of increasing the concentration of a depleted sodium chloride brine solution which comprises introducing salt of about −6 U.S. sieve size and containing calcium sulfate as an impurity into the top of a vertical salt-bed free first column through which brine is flowing upwardly, the rate of introduction of said salt being controlled to avoid formation of a salt bed in said column, said brine having a pH above about 3.5 and being introduced to said column at a concentration below saturation and a linear flow rate between about 15 and about 25 feet per minute, the brine in said first column overflowing into a second salt-bed free column where the linear downwardly flow rate of said brine is between about 0.1 and 3 feet per minute, whereby said salt particles fall freely and are partially dissolved in said first column until they are carried over by the brine flow to said second column where they fall freely through said downwardly flowing brine solution until they are essentially completely dissolved at a point above a trap for undissolved calcium sulfate in which trap the insoluble calcium sulfate impurity collects, thereby producing as effluent from said second column a concentrated brine solution low in calcium ion concentration.

2. The process of claim 1 wherein the upward linear flow rate of the brine is between about 18 and about 23 feet per minute.

3. The process of claim 1 wherein the brine is depleted brine from a mercury electrolysis cell.

References Cited

UNITED STATES PATENTS

| | | | |
|---|---|---|---|
| 1,807,263 | 5/1931 | Walter | 23—312 X |
| 2,281,140 | 4/1942 | Courthope | 23—312 X |
| 2,395,258 | 2/1946 | Drake | 23—312 X |
| 2,412,560 | 12/1946 | Bolton | 23—312 X |
| 2,734,804 | 2/1956 | Courthope | 23—312 X |
| 3,130,016 | 4/1964 | Grier | 23—312 |
| 3,236,609 | 2/1966 | MacKinnon | 23—312 |
| 3,343,919 | 9/1967 | Miller | 23—312 X |
| 3,363,995 | 1/1968 | Driskell | 23—312 |
| 3,365,280 | 1/1968 | Heiss | 23—312 |
| 3,385,674 | 5/1968 | Kolasinski | 23—312 |

FOREIGN PATENTS

| | | | |
|---|---|---|---|
| 613,271 | 1/1961 | Canada | 23—312 |

WILBUR L. BASCOMB, Jr., Primary Examiner

S. J. EMERY, Assistant Examiner

U.S. Cl. X.R.

23—89, 270